Aug. 15, 1950     L. I. COHN     2,519,113
HAND TRUCK
Filed May 28, 1948     3 Sheets-Sheet 1
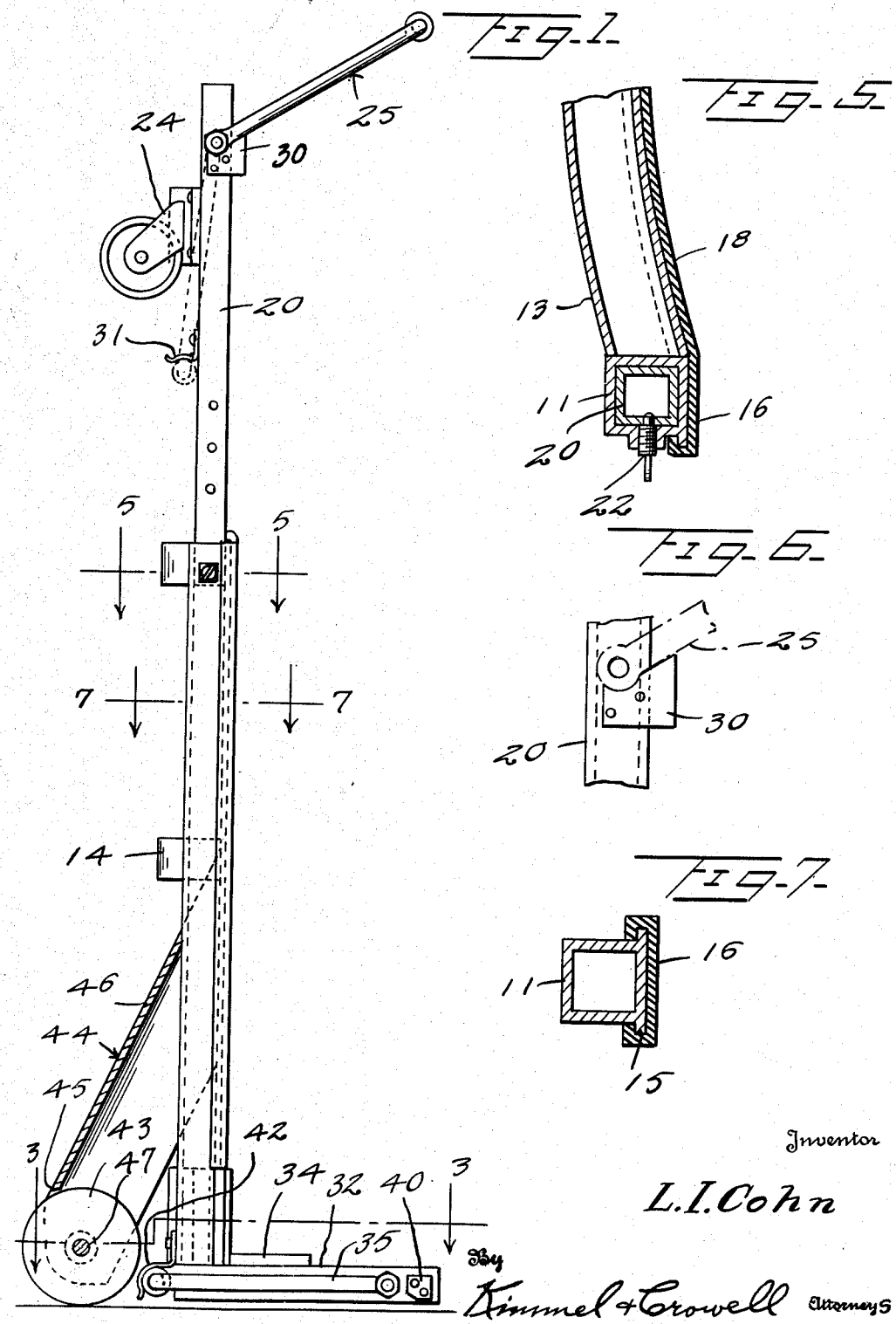
Inventor
L. I. Cohn
By Kimmel & Crowell Attorneys

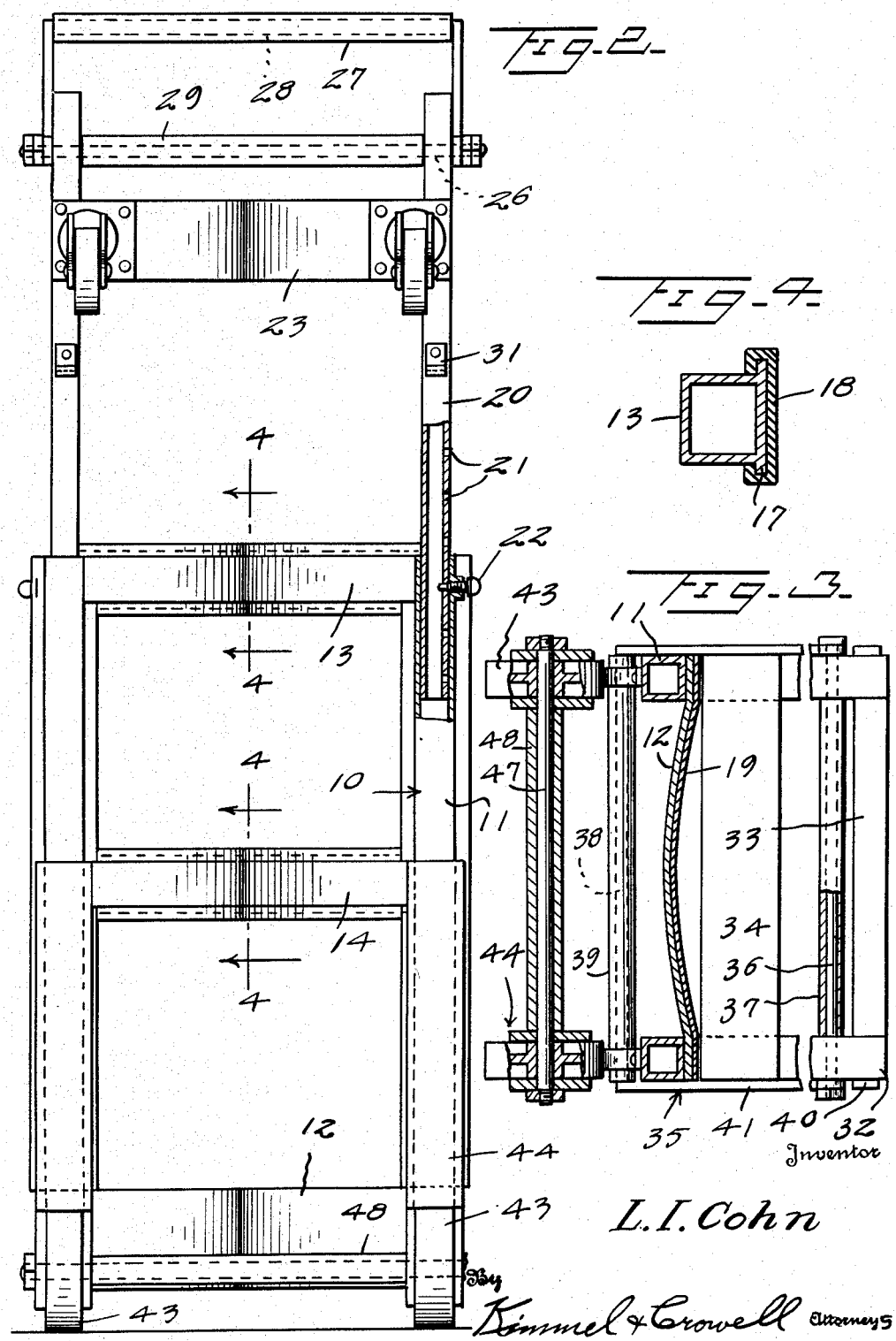

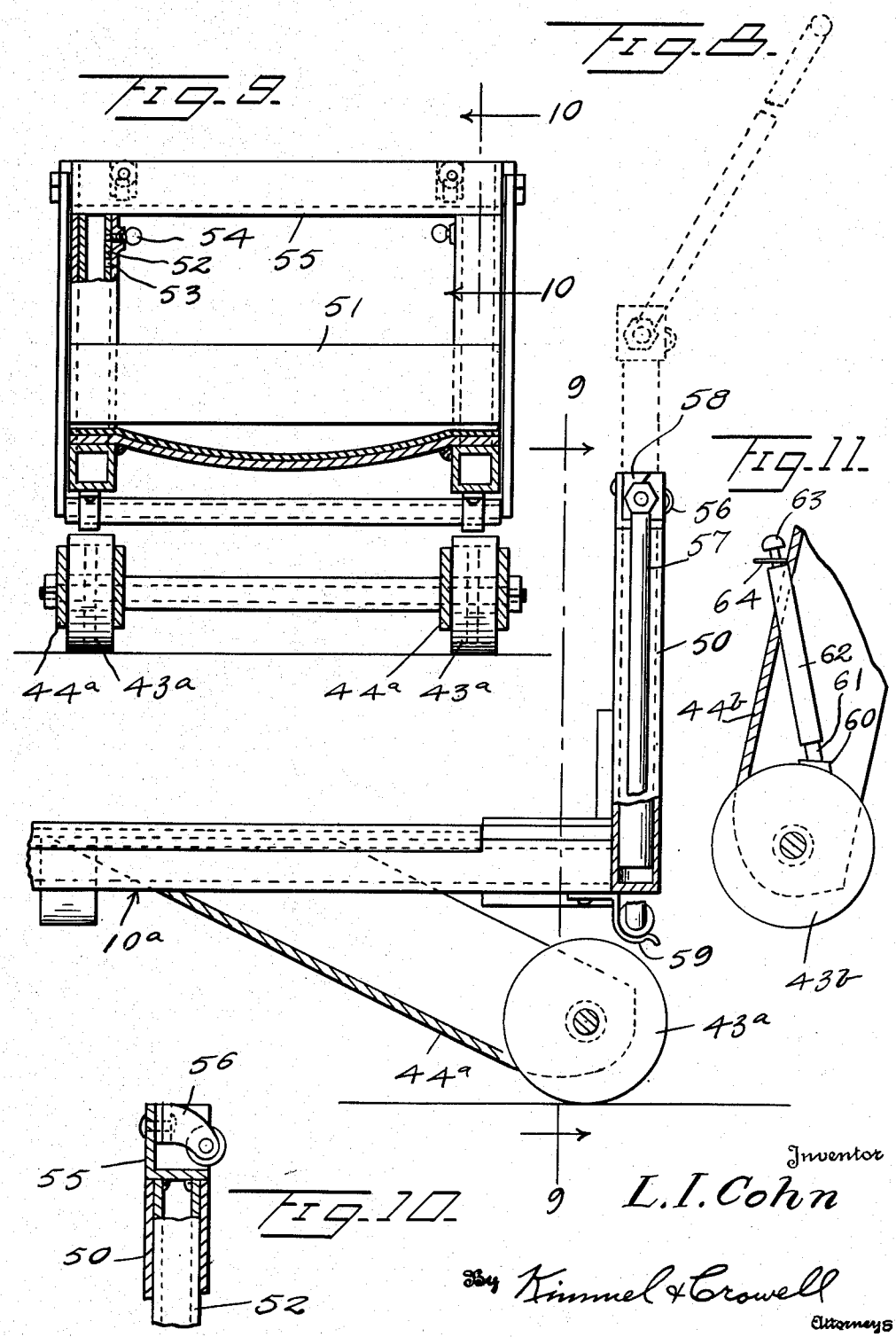

Patented Aug. 15, 1950

2,519,113

UNITED STATES PATENT OFFICE 2,519,113

HAND TRUCK

Louis Israel Cohn, Philadelphia, Pa.

Application May 28, 1948, Serial No. 29,691

3 Claims. (Cl. 280—49)

This invention relates to hand trucks.

An object of this invention is to provide a hand truck which embodies two pairs of wheels so that the truck may be used with either one or both pairs of wheels engaged with the floor or other plane surface.

Another object of this invention is to provide a hand truck which includes collapsible handles or bails at each end thereof so that the device may be optionally used as a push truck or the device may be carried from the handles or bails, as where an article is being moved up or down stairs.

A further object of this invention is to provide skids on the lower side of the truck for engagement with stairs wherein the skids for the supports or bearings for the front axle and the front wheels are partly encased in the skids.

A further object of this invention is to provide a hand truck embodying a metal frame, a rubber covering on the upper side of the frame so that the articles transported by the truck will not be scratched.

A further object of this invention is to provide a hand truck embodying an extensible frame so that articles of different lengths may be transported.

With the above and other objects in view, my invention consists in the arrangement, combination and details of construction disclosed in the drawings and specification, and then more particularly pointed out in the appended claims.

In the drawings,

Figure 1 is a detail side elevation, partly in section, of a hand truck constructed according to an embodiment of this invention, Figure 2 is a detail rear elevation of the device partly broken away and in section, Figure 3 is a sectional view taken substantially on the line 3—3 of Figure 1, Figure 4 is a sectional view taken on the line 4—4 of Figure 2, Figure 5 is a fragmentary sectional view taken on the line 5—5 of Figure 1, Figure 6 is a fragmentary side elevation of the upper end of the extensible frame showing the bail stop, Figure 7 is a sectional view taken on the line 7—7 of Figure 1, Figure 8 is a fragmentary longitudinal section of a modified form of this invention, Figure 9 is a sectional view taken on the line 9—9 of Figure 8, Figure 10 is a fragmentary sectional view taken on the line 10—10 of Figure 9, Figure 11 is a fragmentary sectional view of another modification of this invention.

Referring to the drawings, the numeral 10 designates generally a fixed frame structure which is formed of parallel side members 11, with the side members 11 formed of tubular material. The tubes from which the side members are formed are herein disclosed as being substantially square in transverse section. The side members 11 at their forward ends are connected together by means of a longitudinally bent tubular connecting bar 13. An intermediate tubular connecting bar 14 is fixed between the side members 11 at a point substantially midway between the front and rear members 12 and 13 respectively. The connecting members 12, 13 and 14 are bowed downwardly so that a round object may be seated on the upper side of the frame.

The side members 11 are provided with oppositely extending flanges 15 and a rubber sheath or jacket 16 engages over the front or upper side of each tubular member 11 and is hooked over the flanges 15, as shown in Figure 7. The connecting bars 13 and 14 as shown in Figure 4, are also formed with longitudinally extending flanges 17 and a rubber sheath or cover 18 engages over the upper side of bar 13 and is hooked over the flanges 17. The bar 14 is constructed similar to bar 13 and is covered with a sheath 18 as shown in Figure 4.

The forward bar 12 is coated on its upper side with a rubber or flexible coating 19 so that a highly finished article will not be scratched when engaging with the truck frame. The frame 10 also includes extensible side bars 20 which telescope into the side bars 11 and are provided with spaced openings 21 within a selected one of which a set screw 22 threaded through the side member 11 is adapted to engage for holding the extension members 20 in selected or extended or retracted position.

The extension members 20 are connected together by means of a longitudinally bent connecting plate or bar 23 and as shown in Figures 1 and 2, the connecting bar or plate 23 has secured thereto a pair of caster wheels 24. A bail or handle 25 is pivotally secured on a transversely extending bar or rod 26 extending through the extension bars 20, and the bail 25 includes a tubular member 27 rotatably carried by the central portion 28. A tubular member or sleeve 29 is also disposed about the rod 26 between the extension members 20 and provides a handle which may be used when the bail 25 is in collapsed position. The bail 25 is swingable across the outer ends of the extension members 20 and is limited in its forward movement by means of a pair of stop plates 30 fixed to the extension members 20, as shown in Figure 1.

The stop members 30 will hold the bail 25 at an obtuse angle with respect to the extension members 20. When the bail 25 is collapsed it is swung counter-clockwise as viewed in Figure 1, and is held in its collapsed position by means of spring clips 31 which are fixed to the lower or rear sides of the extension members 20.

The frame 10 at its lower or forward end has secured thereto a pair of right angularly disposed tubular members 32 which are connected together at their upper or outer ends by a connecting bar 33. A plate 34 is fixed to the inner or rear sides of the tubular members 32 and forms an abutment against which the article engaging on the connecting bars 12, 13 and 14 is adapted to abut.

A collapsible U-shaped bail 35 is pivotally mounted on a transversely extending rod 36 which extends between the tubular members 32 and a sleeve or tubular member 37 engages about the rod 36 between the tubular members 32. The central portion 38 of the bail 35 has a tubular member 39 loosely mounted thereon forming a handle, and the bail 35 is limited in its outward swinging movement by means of a pair of stop members 40 which are fixed to the outer sides of the tubular members 32 adjacent the outer ends of the latter.

The bail 35 is adapted to be held in collapsed position with the parallel side members 41 thereof extending lengthwise of the tubular members 32 by means of spring clips 42. The spring clips 42 are fixed to the forward or lower ends of the side members 11. The forward portion of the frame 10 has mounted thereon a pair of wheels 43 and in the present instance the wheels 43 are mounted partly within U-shaped or channel-shaped supporting and bracing members 44 which are fixed to the side members 11 and extend forwardly from the side members on an obtuse angle.

The wheels 43 rotatably engage in cut-outs 45 which are formed in the web 46 of the channel members 44 and as herein disclosed, the two wheels 43 are mounted on a common axle or shaft 47 with a tubular spacer 48 disposed between the two channel members 44.

Referring now to Figures 8, 9 and 10, there is disclosed a modified form of this invention embodying a frame structure 10a similar in every detail to the frame 10, having a pair of front wheels 43a mounted between parallel sides of channel members 44a which are fixed to the frame 10a and extend forwardly and downwardly on an obtuse angle. The forward end of the frame 10a has secured thereto a pair of tubular members 50 which are connected together at their inner ends by a connecting plate 51. The tubular members 50 have slidable therein tubular extension members 52 formed with openings 53 within which set screws 54 are adapted to selectively engage for holding the extension members 52 in either extended or retracted position.

The outer ends of the extension members 52 are connected together by a connecting member 55 which in the present instance is in the form of an angle member and a pair of caster wheels 56 are carried by the connecting member 55 and are adapted to cooperate with the forward wheels 43a in movably supporting the frame 10 on the floor or plane surface with the frame 10a in upright position and the head formed by the tubular members 50 and 52 in a horizontal position. The extension members 52 have pivotally secured thereto a U-shaped bail 57 which is limited in its upward swinging movement to operative position by means of a stop 58 secured to the end of the connecting member 55. When the extension member formed by the extension tubes 52 and connecting member 55 is in retracted position, the bail 57 is adapted to be releasably secured in inoperative position with the sides thereof parallel with the tubular members 50, by means of spring clips 59 secured to the forward ends of the sides forming the frame 10a. In other respects the structure shown in Figures 8, 9 and 10 is similar to that shown in Figures 1 to 7 inclusive.

In the use and operation of this hand truck, the article to be moved is engaged on the saddle formed by the longitudinally bent connecting members 12, 13 and 14, the concave sides of these members being uppermost. If desired, the truck may be moved with the frame 10 in a partly elevated position and the wheels or rollers 43 engaging with the floor or plane surface. In this position of the truck, the bail 25 may be collapsed to the dotted position shown in Figure 1. If the article is relatively heavy, the frame 10 may be lowered to a substantially horizontal position so that the caster wheels 24 will also engage the floor or plane surface with the wheels 43. The truck may be pushed over the floor or plane surface by extending the forward bail 35. If it is necessary to carry the article on this truck up a stairway, the two bails 25 and 35 may be swung to their extended position and the truck then carried up the stairs. By providing the wheel mounts 44 as herein disclosed, and disposing these wheel mounts on an obtuse angle with the wheels 43 substantially enclosed within the channel members 44, the latter may be used as skids, moving the truck either up or down the stairs without scratching the stairs.

Referring now to Figure 11, the wheels 43b corresponding to the wheels 43 in Figure 1 are journaled in the channelled wheel supports 44b, and may be locked against rotation when the truck is upright by means of retractable stop members 60. The stop members 60 are carried by spring-pressed plungers 61 which are extendible from housings 62. The housings 62 are fixed to the channel members 44b, and the plungers 61 which extend above the housings 62 and have knobs 63 thereon are releasably locked by locking rings 64. It will be understood that the structure shown in Figure 11 may be used with the truck shown in either Figure 1 or Figure 8.

I do not mean to confine myself to the exact details of construction herein disclosed, but claim all variations falling within the purview of the appended claims.

I claim:

1. A hand truck comprising a rectangular frame formed of parallel side bars, connecting bars fixed between said side bars, a right angularly disposed head member fixed to the forward ends of said side bars, a pair of front wheels, and combined skid and wheel bearing members fixed to said side bars and inclined downwardly and forwardly relative thereto, each bearing member being of U-shape in transverse section with the side walls thereof secured in overlapping position to said frame side bars and being formed with a cutout, in the bottom wall thereof each of said wheels being rotatably disposed between said side walls and projecting downwardly through said cutout.

2. A hand truck comprising a rectangular frame formed of parallel side bars connecting bars fixed between said side bars, oppositely disposed lengthwise extending flanges carried by the front faces of said side bars and certain ones of said connecting bars, a slotted rubber covering engaging over the front faces of said side bars and said certain ones of said connecting bars and extending about said flanges, a right angularly disposed head member fixed to the forward ends of said side bars, a pair of front wheels, and combined skid and wheel bearing members fixed to said side bars and inclined obtusely relative thereto.

3. A hand truck comprising a rectangular frame formed of parallel side bars, connecting bars fixed between said side bars, each side bar comprising a pair of telescoping tubular members, a wheel rotatably carried by each tubular member, means securing said tubular members in endwise adjusted position, a right angularly disposed head member fixed to the forward ends of said side bars, said head member being formed of an inner pair of tubular members fixed to said side bars, an outer pair of tubular members telescoping into said inner tubular members, a connecting bar fixed between said outer tubular members, caster wheels carried by said connecting bar, a bail pivotally carried by said outer pair of tubular members and adapted to be swung downwardly into retracted juxta position with said head member, and means carried by said inner pair of tubular members for releasably holding said bail in retracted position.

LOUIS ISRAEL COHN.

REFERENCES CITED

The following references are of record in the file of this patent:

UNITED STATES PATENTS

| Number | Name | Date |
| --- | --- | --- |
| 608,898 | Nutting | Aug. 9, 1898 |
| 910,304 | Nash | Jan. 19, 1909 |
| 1,164,332 | Brown | Dec. 14, 1915 |
| 1,270,024 | Evenson | Dec. 2, 1919 |
| 2,277,302 | Chenette | Mar. 24, 1942 |